Patented Feb. 17, 1942

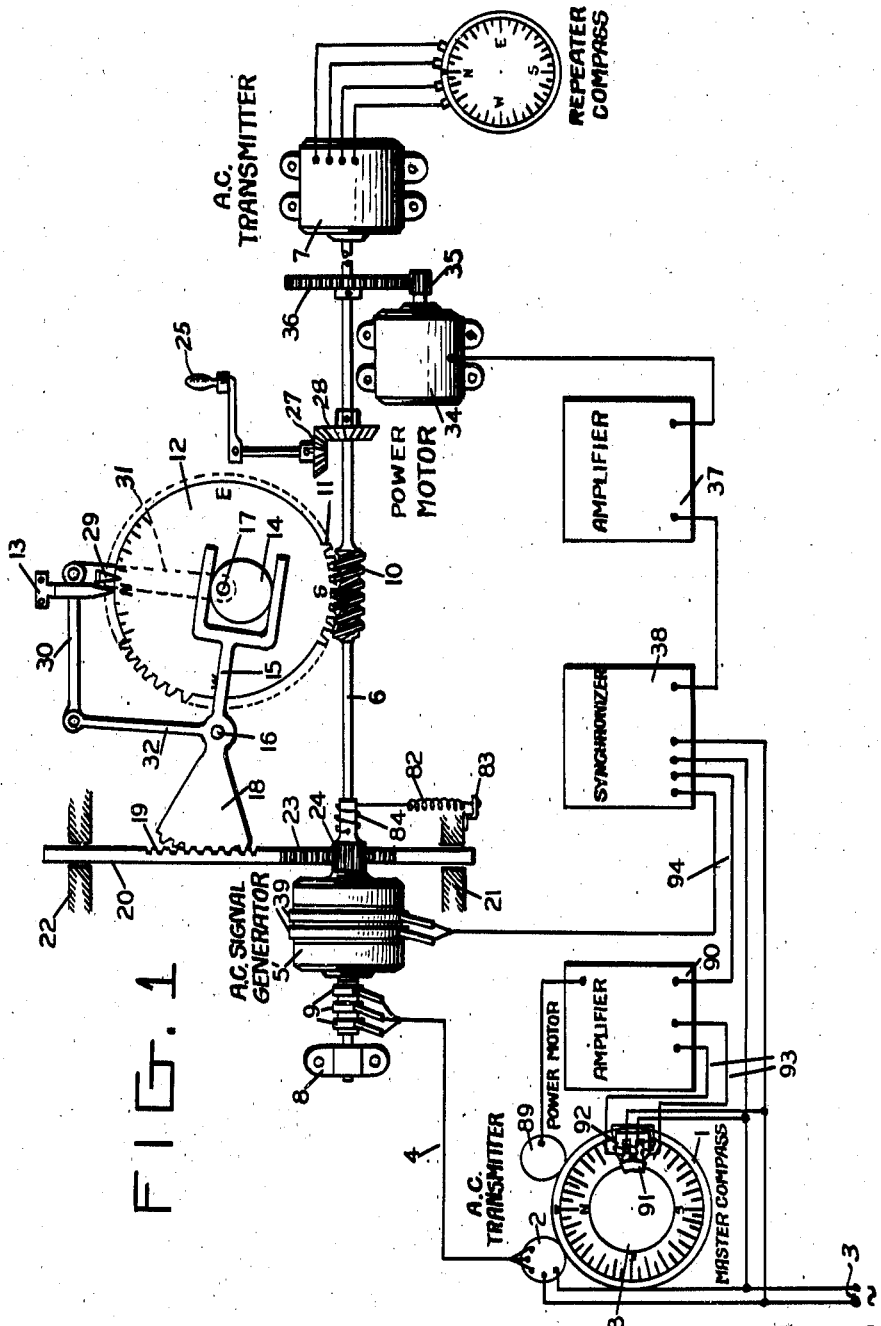

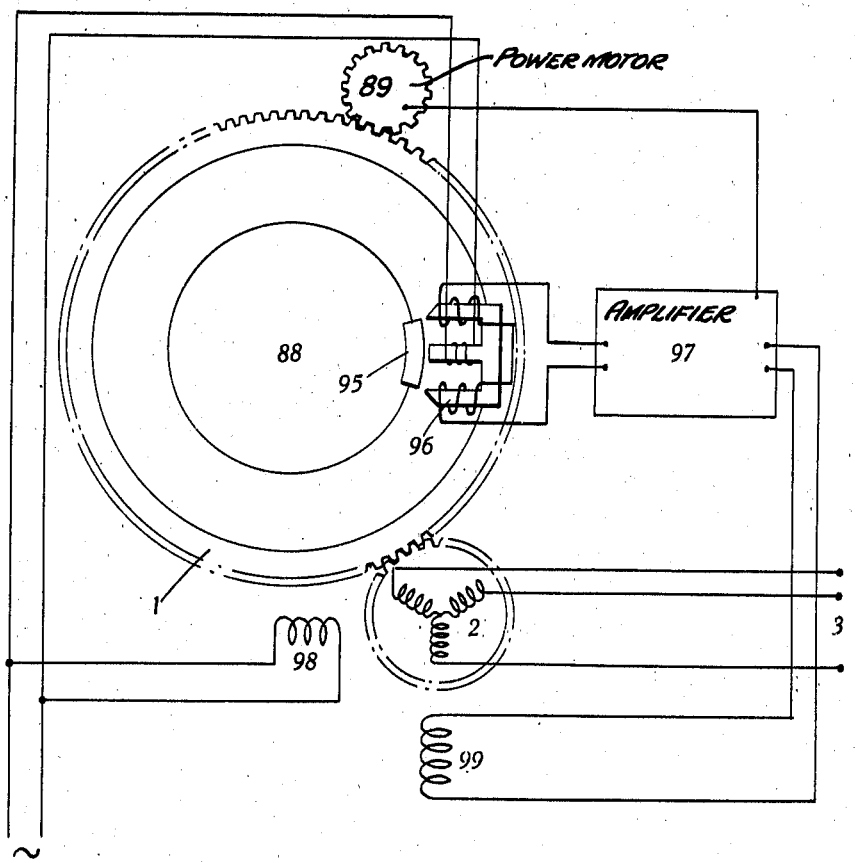

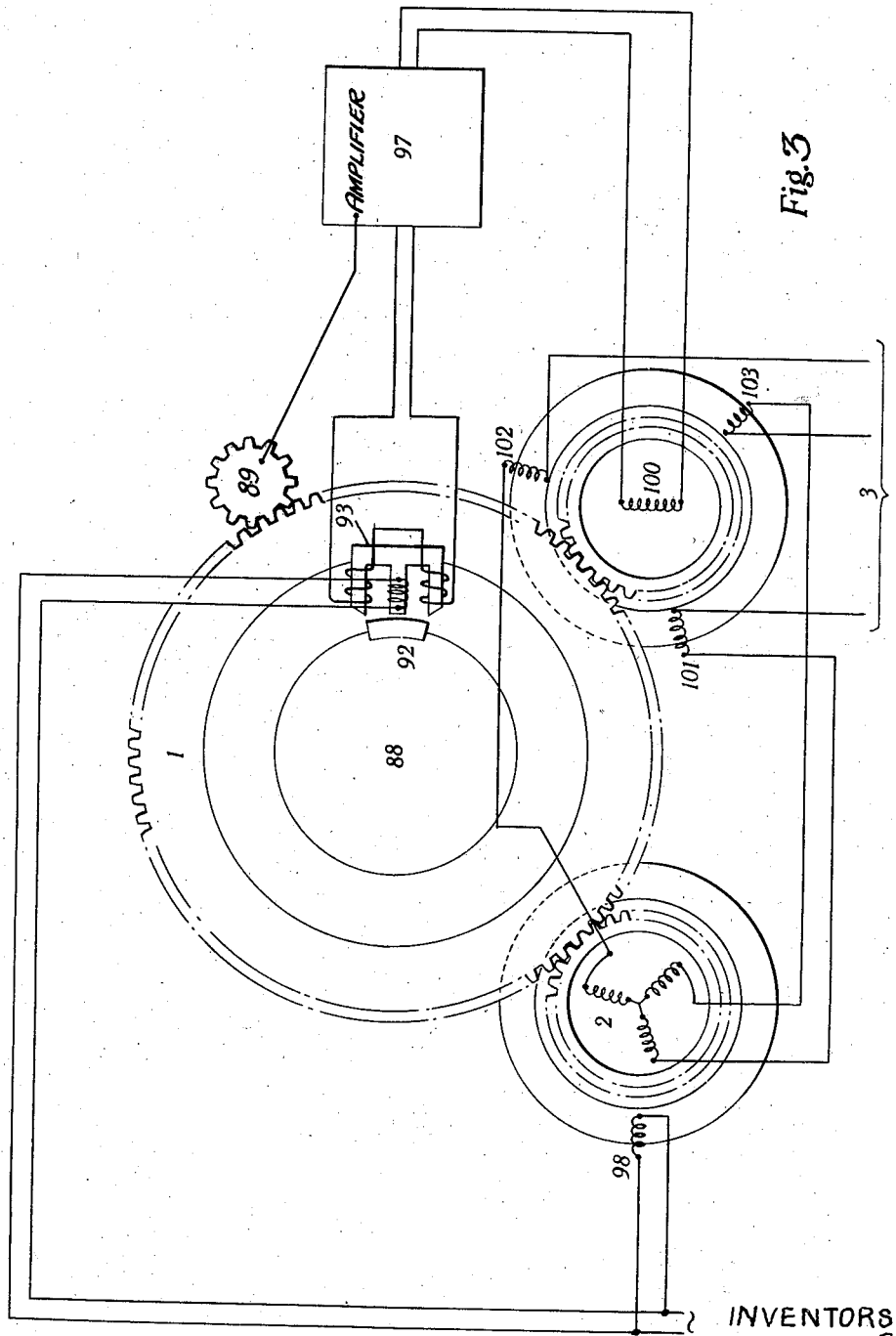

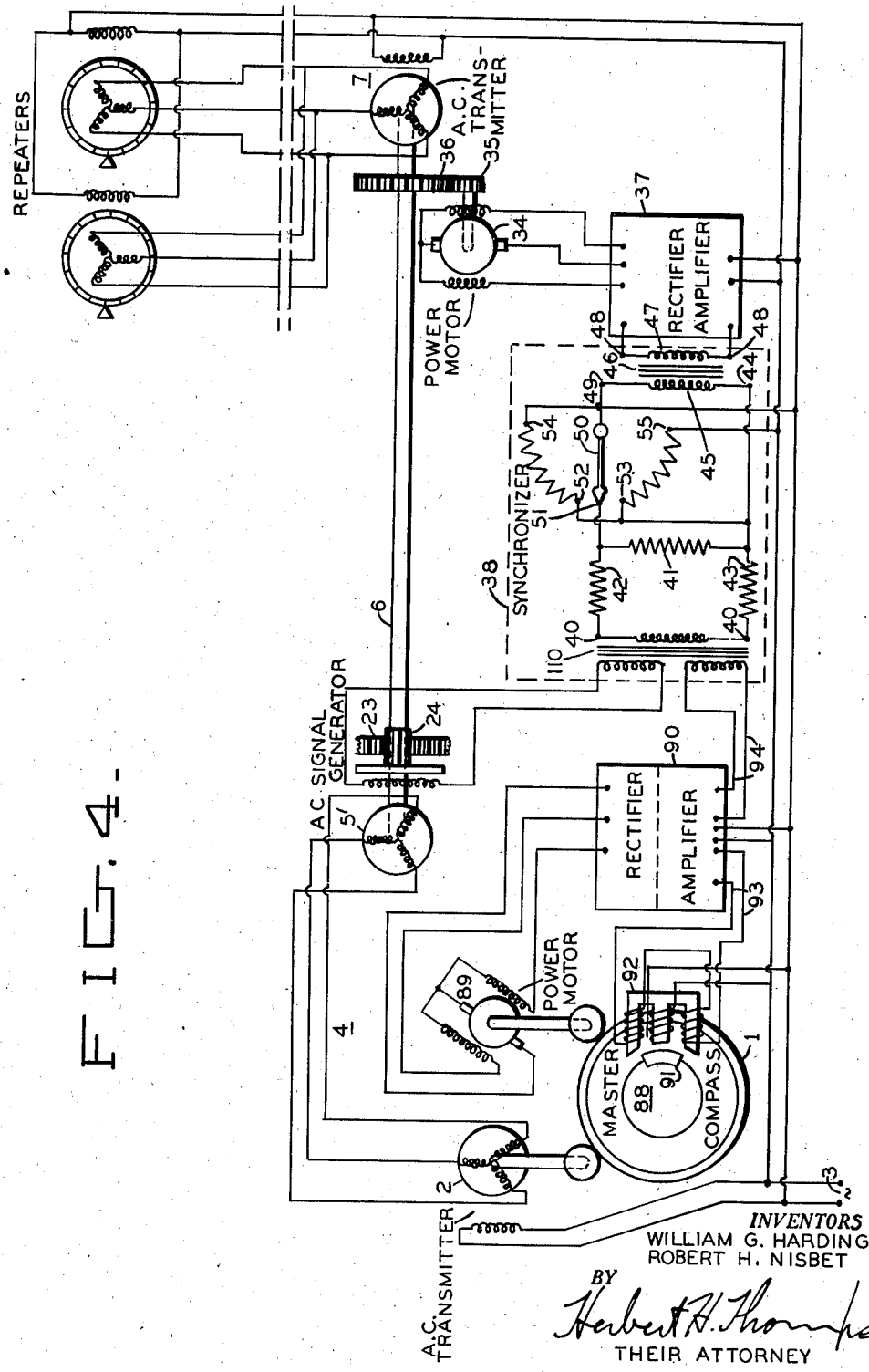

2,273,808

UNITED STATES PATENT OFFICE 2,273,808

SYSTEM FOR TRANSMITTING INDICATIONS

William George Harding, Whitton, and Robert Hayes Nisbet, Osterley, England, assignors to Sperry Gyroscope Company, Inc., Brooklyn, N. Y., a corporation of New York Application May 5, 1938, Serial No. 206,208
In Great Britain May 7, 1937

8 Claims. (Cl. 33—226)

The present invention relates to transmission systems for transmitting indications from a measuring or indicating instrument, such as a magnetic or gyroscopic compass, and in particular to means for introducing corrections into the transmission means so as to correct for errors of known type in the indicating instrument.

In accordance with the present invention a system for transmitting indications from a member which follows up a sensitive indicator (such as the directional element of a gyroscopic or magnetic compass) comprises means for measuring the lag in the following-up, and for compensating therefrom the transmission system so that the signals received by a repeater or repeaters, or indications determined by them, are free from lag. The term "lag" used in this specification is intended to connote error in the following-up of the indicator by the follow-up member, which lag may be negative, as when the follow-up overshoots the indicator.

The principal object of the present invention is therefore to correct a transmission system transmitting from a member following up a sensitive indicator (such as the directional element of a compass) by compensating the transmission signals for the error in the said follow-up member, so that the true position of the sensitive element is transmitted, rather than the position of the follow-up element.

We show a number of modifications of our invention to compensate the transmission from a gyro compass for this error of the compass.

In order that the invention may be fully understood and carried into effect, various embodiments thereof will now be described by way of example with reference to the accompanying drawings, in which:

Figure 1 is a diagrammatic lay-out of a system in accordance with the present invention;

Figs. 2 and 3 are diagrammatic views showing two modified forms of electrical arrangement for effecting correction of the indication to be transmitted, and Fig. 4 is a wiring diagram of the form of the invention shown in Fig. 1.

Referring first to Figs. 1 and 4, the compass or sensitive indicator from which transmission is to be effected is shown at 1. A transmitter 2 of the selsyn type is supplied with alternating current from supply mains 3 and transmits, via cable 4, signals by way of slip rings 9 to the rotor of a receiver or selsyn type A. C. signal generator 5', mounted in any convenient position remote from the compass—e. g. on the ship's bulkhead. The shaft 6 of generator 5' is coupled to that of a relay transmitter 7 either directly or through gearing, so that the rotors of both instruments turn through equal or proportional angles.

The single phase winding of the stator of generator 5' is rotatably mounted on the shaft 6, which, in turn, is rotatably mounted in bearings 8. In order to permit the stator to rotate, the transmission lines therefor are connected to it via slip rings 39.

Geared to generator shaft 6 through gearing 10, 11 is a member 12, the gearing being such that, in the absence of corrections applied by the corrector mechanism to be described below, this member 12 turns through the same angle as the compass or primary element 1. As will become evident, corrections are applied when the corrector mechanism is in operation, so that member 12 does not turn through the same angle as compass 1—being, in fact, free from the north-steaming error of compass 1. Member 12 can therefore act as a "true" compass card, and it is marked out in degrees and with compass indications for this purpose. The "true" course may then be read against a suitably placed fixed index such as 13.

The "true" compass card 12 carries a slide rest (not shown) on which an eccentric cam 14 is slidably mounted, so that it may be adjusted in position to have any desired eccentricity. In practice, the eccentricity given is chosen or set in accordance with scales or tables of latitude and ship's speed.

Engaging with eccentric cam 14 is a forked lever 15 pivoted at 16: if desired, a slide block may be interposed between cam 14 and the jaws of the forked lever to provide wearing surfaces. It is evident that, as card 12 and eccentric cam 14 rotate about axis 17, the forked lever will oscillate about the pivot 16, undergoing one complete oscillation for one revolution of the card 12. As is shown in the specification of our copending application, now Patent No. 2,128,559, dated August 30, 1938, for Gyro compasses, the angle through which lever 15 is oscillated is equal to the north-steaming error of the compass if the eccentricity of the eccentric 14 is correctly proportioned relative to the spacing of axes 16, 17 in accordance with the latitude and the ship's speed.

Attached to forked lever 15 is a gear sector 18 engaging with rack teeth 19 on a member 20, so as to cause it to slide in guides 21, 22. Movement of rack member 20 operates, through rack-and-pinion gearing 23, 24, to turn the stator of the A. C. signal generator 5'. The gear ratios are selected so that, if $k$ is the gear-ratio between shaft 6 and card 12, then the overall gear-ratio between arm 15 and the stator of the receiver 5 is also $k$—i. e. the stator turns through an angle $k$ times that through which arm 15 turns about axis 16.

Since the relative rotation between the shaft 6 and the stator of receiver or generator 5' corresponds to the signals received from transmitter 2 (i. e. to the uncorrected compass heading), and since the rotation of the stator corresponds to the correction, the rotation of shaft 6 corresponds to the "true" or corrected heading, as is desired. The generator 5' thus acts as an electric differential, giving an output which is the sum of the inputs from cable 4 and the input from rack 20. It follows from the fact that shaft 6 is "corrected," that the transmitter 7, and other transmitters driven from shaft 6, transmit "true" compass readings, which, also, are indicated on card 12 by index 13.

In order to set card 12 into alignment with compass 1 when first bringing the system into operation, a handle 25 is provided for turning shaft 6 by means of gears 27, 28. A separate index 29 is provided so that the uncorrected compass reading may be read against it on card 12 and compared with the reading on compass 1.

Since the card 12 is "true," as read against index 13, it is necessary to displace the index 29 through the correction angle from index 13. This result is brought about by a parallelogram linkage 30, 31, 32. This consists of two equal arms 31 and 32, of which 32 is rigid with lever 15, and therefore pivots about axis 16, while 31 is pivoted about axis 17 and carries the index 29. The connecting link 30 is equal in length to the distance between axes 16 and 17, with the result that any oscillation of lever 15 about axis 16 causes the arm 31 to oscillate about axis 17 through the same angle—which is, of course, the correction angle. In order to synchronise the system, it is therefore only necessary to turn handle 25 until the heading read against index 29 is the same as that read on compass or primary direction indicating element 1. Suitable provision may also be made for correcting the damping error of the compass by adjustably mounting the rack with respect to the synchronizing index 29.

It will be seen that both the North-steaming error and the damping error corrections are imparted to the transmitter 7 and the index 29. It is to be appreciated, however, that other types of error correctors such as that shown in Patent No. 2,110,766, may be used.

In the transmission systems shown in Figs. 1 and 4, a servo-motor or power motor 34 is employed coupled to shaft 6 through gearing 35, 36. The single-phase winding on the stator of the selsyn type signal generator 5', instead of being excited from the alternating current supply as a primary winding in an ordinary selsyn transmission system, is connected through a synchronizer 38 to an amplifier 37 which supplies the energy to drive power motor 34, the winding therefore acting as the secondary winding of a variable rotary transformer.

The amplifier 37 causes the servo-motor 34 to run until the input to the amplifier 37 is zero. An amplifier suitable for this purpose is described in the prior patent to R. H. Nisbet (one of joint applicants), No. 2,064,945, dated September 22, 1936, for Remote control systems, or in the prior patent to F. L. Moseley, No. 2,088,659, dated August 3, 1937.

Servo-motor 34 will thus cause shaft 6 to rotate relatively to the stator of signal generator 5' through the angle turned through by transmitter 2. The correction is applied by the corrector mechanism as described to rotate the stator of the generator 5'. Generator 5' therefore acts as an electrical differential. The advantage of using the servo-motor 34 is particularly apparent when selsyn relay transmission is employed (i. e. when the transmitter or transmitters 7 connected or geared to shaft 6 are selsyn transmitters transmitting to a large number of selsyn receivers). In such a case, the entire frictional and driving loads of the receivers become effective on the transmitters 7, and the torque required to turn them is greater than can be provided with accuracy by a single generator such as 5' alone.

In a practical form of the system of Figure 1 the stator and rotor of the generator 5' may be interchanged, that is to say, the servo-motor 34 is geared to the stator, whereas the corrector lever 15 is geared to the rotor. In this way the load on the corrector is still further lightened, since it is easier to turn the rotor than the stator. Moreover, the worm gearing 10, 11 may be replaced by a train of spur gears, as may also be rack-and-pinion gearing 23, 24, and rack-and-gear sector 18, 19. The member 20 is in this case replaced by a gear turning about an axis parallel to the axis 17 of card 12. The servo-motor 34, the generator 5', and all the gears, therefore, have parallel axes and can be disposed round card 12.

In a portion of Fig. 4 is a diagram of the circuit arrangements of the preferred form of synchroniser for use at 38 in the system of Figure 1. The input terminals 40 receive the output from the generator or variable transformer 5' of Figure 1. This input is applied to the resistance 41 through resistances 42, 43. One side of resistance 41 is connected to terminal 44 of the primary winding 45 of a transformer 46, the secondary winding 47 of this transformer being connected to the output terminals 48, which are connected to the amplifier 37 of Fig. 1. The other terminal 49 of the primary winding 45 is connected to a rotary contact arm 50, which is spring-constrained to a central position in which it makes contact with a contact stud 51 connected to resistance 41. Under normal conditions, therefore, the primary winding 45 is connected across the resistance 41, so that the voltage developed across resistance 41, which voltage is part of the input voltage from the variable transformer 5', is applied to transformer 46 and therefore to the amplifier 37.

If, initially, the indication given by card 12 differs from that given by compass card 1 by more than half a revolution of the generator or variable transformer 5', it becomes necessary to supersede this normal condition of operation by a manually controlled condition. For this purpose, a handle (not shown) is provided for turning the rotary contact arm 50 to one side or the other against the centralising springs.

The first movement of the arm 50 breaks the contact of the arm with stud 51, thus disconnecting the output from the normal input from the variable transformer 5'. The next movement takes the contact arm 50 to contact stud 52 or 53 according to the direction of movement. These two studs are connected together, and to terminal 44 of the primary winding 45 of transformer 46. This winding 45 is therefore short-circuited, and the output of the transformer 46 is consequently zero. The studs 52 and 53 are respectively connected through potentiometer windings with terminals 54 and 55, which are connected to the source of alternating current 3. Movement of contact arm 50 beyond either studs 52, 53 causes it to move over one of the potentiometer windings and to produce an increased alternating current voltage in the primary circuit winding 45 of transformer 46. In this way, sufficient input may be given to the amplifier 37 to run the servo-motor 34 at any desired speed in either direction at will, and, when arm 50 is released, the system reverts at once to automatic operation.

In Figs. 1 and 4 we have shown examples of relay transmission in which a servo-motor is used to provide the necessary power to drive the transmitter (or transmitters) 7, and we have employed therein the principle that the servo-motor 34 is directly coupled to the transmitter 7 so as to turn proportionally therewith, the correction being inserted between the servo-motor 34 and the controller for the servo-motor (i. e. generator 5').

In the systems of Figs. 1 and 4 and similar systems in which the servo-motor 34 is directly coupled to the transmitter 7 and the corrector, or similar device for ensuring non-proportionality, is in the repeat-back from the servo-motor to its controller, it is important to prevent lost-motion in the repeat-back, otherwise any attempt to ensure high sensitivity, in order to obtain accuracy in working, will result in "hunting" of the system. For this reason we spring-load the whole corrector mechanism, and preferably also the gearing, so as to keep all the parts under tension in one direction.

In Figure 1 there is shown a spring 82, one end of which is attached to a fixed support 83, while the other is attached to a wire or tape passing round a sleeve 84 forming an extension of the stator of generator 5'. The spring tension tends to rotate the stator.

In its more general aspect, the principal feature of the invention disclosed in Figures 1 and 4 is the provision of a control system for controlling a controlled object to move non-proportionally to the movement of a controlling object or indicator, characterised by the fact that the controlled object is moved by a servo-motor turning proportionally therewith and controlled by a controller operated in part by the indicator and in part by a repeat-back from the servo-motor, the required non-proportionality of the operation being obtained by the use of a non-proportional device in the repeat-back connection.

Transmission systems for transmitting the indications of a compass to repeater compasses are apt to include errors other than the north-steaming and damping errors that are present if the compass is a gyroscopic one. Gyro compasses, and those magnetic compasses that are provided with transmission systems, always include a follow-up element, which follows up the sensitive or directional element, and the transmission is effected from this follow-up element. In fact, in the system of Figures 1 and 4, as applied to a gyro-compass, the reference numeral 1 may in all cases be considered to be the follow-up or secondary element of the compass. However, it is the position of the sensitive directional element or indicator that should be transmitted, and the substitution for this of transmission of the position of the follow-up element results in there being a component error in the position of the repeaters equal to the lag or error in following of the indicator by the follow-up element: this component error will be present in addition to errors due to other causes.

A further object of our invention is therefore to correct a transmission system transmitting from a member following up a sensitive indicator (such as the directional element of a compass) by compensating the transmission signals for the error in the said follow-up member.

This is first described as applied to the system shown in Figure 1. As has been explained, the selsyn transmitter or generator 2 is geared to the follow-up element 1 of the compass, and in Figure 1 this follow-up element is shown as following the directional element 88 of the compass. The follow-up system employed for ensuring this may be of the kind disclosed in U. S. Patent No. 2,139,558 of Moseley, Cooke, and Frische, dated December 6, 1938, for Follow-up system for gyro compasses. In this the follow-up power motor 89 is controlled by an amplifier 90, itself controlled by a two-part electrical pick-off inductive controller 91, 92 comprising a part 91 mounted on the sensitive or directional element 88 and a part 92 mounted on the follow-up element 1. This two-part controller provides a measurement of the relative displacement of members 1 and 88 —i. e. of the lag in following—and the amplifier 90 controls the follow-up motor 89 to run in the sense required to make this lag zero. At any given instant, however, this lag may not be zero, so that the transmission from transmitter 2 is erroneous by the amount of this lag.

The receiver 5' for the output of transmitter 2 is a selsyn signal generator providing an alternating current voltage measuring the difference in angular position between shaft 6 and the shaft of transmitter 2, and therefore measures the difference in angular position between the card 12 and the follow-up member 1 of the master compass, and this voltage is applied to amplifier 37 to control servo-motor 34. Such selsyn signal generating systems are well known in the art, as shown at 3 and 9 in the patent to Harvard L. Hull, No. 2,068,490, dated January 19, 1937, for Positional control systems. According to the present invention, we correct for the difference in angular position between members 1 and 88 of the compass by measuring this difference and using it to correct the control indication for the servo-motor 34—i. e. we provide a voltage measuring the difference in position between 1 and 88; we add this voltage to the voltage provided by receiver 5', which measures the difference in position between 12 and 1, as by means of transformer 110 (Fig. 4), and we apply the sum of the two voltages, instead of the second voltage alone, to amplifier 37 for controlling the servo-motor 34. This voltage measures the difference in position between the card 12 and the directional element 88, so that the card 12 is driven by the servo-motor 34 to follow the directional element 88 instead of the follow-up element 1.

It is particularly easy to apply this correction to a system like that of Figs. 1 and 4 in which a two-part controller 91, 92 measuring the difference in position between the elements 1 and 88 already exists for the purpose of controlling the follow-up element 1. It is then necessary only to add the voltage output of the controller 91, 92 to that of generator receiver 5'. Preferably however we use an amplified version of the voltage output of the pick-off controller 91, 92, and we obtain this from a suitable stage of amplifier 90. As shown in Figs. 1 and 4, the output of controller 91, 92 is passed to the amplifier 90 by the lines 93. In the anode or cathode circuit of the first amplifying valve of this amplifier a voltage is developed and this is applied to the synchroniser 38 via cable 94. In synchroniser 38 this voltage is added to that received from receiver 5'.

It is clear also that even if the follow-up element 1 were controlled to follow-up the directional element 88 by means other than the two-part controller 91, 92, it would still be possible to add a device similar to this controller for the sole purpose of measuring the lag in following and for correcting the output of the generator 5' in accordance therewith.

Such a system constitutes a remote position control system in which the card 12 or controlled element is caused by servo-motor 34 to follow-up a directional or controlling element 88 by means of a control system controlled by the difference in position between the controlled and controlling elements, this difference being measured in two stages. The first stage is the measurement of the difference of position between the controlled element and a third element, following-up the controlling element independently of the controlled element, and the second stage is the measurement of the difference in position between this third element and the controlling element.

It is found that the best amount of correction to apply via cable 94 to be added to the signal from generator 5' is not necessarily that which would just correct the voltage input to the amplifier 37 for the lag in the following of element 88 by element 1; it is better, in fact, to overcompensate, as this tends to compensate for errors in the operation of motor 34 by which it fails to reproduce instantaneously the positions corresponding to the indications received from the amplifier 37. Since the signal received by amplifier 90 via cable 94 corresponds to similar errors in operation of motor 34, it is possible, by over-compensating the input to amplifier 37, for the last-mentioned errors to forestall, and partly nullify, the similar errors of motor 34.

The general idea of correcting the transmission from the follow-up element of the compass or other indicator, so that it is free from the follow-up errors, may be applied even to systems in which relay transmission is not employed. In Figure 2 there is shown a method of correcting selsyn transmission signals for follow-up lag.

The follow-up element 1 is controlled by means (not shown) to follow-up the directional element 88, and a measuring device, which may be a variable air-gap balanced transformer having a core member 96 on the follow-up element and a soft-iron armature 95 on the directional element 88, is provided to measure the lag in following.

The selsyn transmitter 2 is geared to the follow-up element 1. Its armature winding is of the usual type, similar to a three-phase winding, and transmission lines 3 are connected to it by slip rings. The stator, however, has no salient poles, but has two distributed windings 98 and 99 for producing perpendicular fields. Field winding 98 is energised from the same alternating current supply that supplies transformer 96, and field winding 99 is supplied from an amplifier 97 whose output is an amplified version of the output of transformer 96. The resultant field in the selsyn transmitter 2 is therefore rotated from the axis of the field 98 by an angle proportional to the output of the transformer 96 (i. e. by an amount proportional to the lag). By making the factor of proportionality correct, the transmission signals are therefore corrected for this lag.

In this system the circuit of winding 99 is made of very low impedance, so that it acts as a short circuit. For this purpose, the output transformer of the amplifier 97 is made of a high step-down ratio, and preferably the output valves of the amplifier are negatively back-coupled, so that their effective output-impedance is low.

An alternative method of correcting a selsyn transmission is shown in Figure 3. As in Figure 2, a device 92, 93 is employed for measuring the lag in following. This is measured as a voltage at the same frequency as the supply to the field winding 98 of the salient-pole selsyn transmitter 2. This voltage is amplified by the amplifier 97, and applied to the field winding 100 of an auxiliary transmitter, also geared to the follow-up element of the compass, and preferably of the kind having the field-winding on the rotor. The stator-winding consists of three separated windings 101, 102, and 103 of low impedance. Each of these windings is connected in one of the tranmission lines 3 from the transmitter 2, with the result that the voltages transmitted from transmitter 2 are corrected by the voltages in these windings. These latter voltages themselves depend on the lag in following, so that the transmission is corrected by this amount.

Having now particularly described and ascertained the nature of our said invention and in what manner the same is to be performed, we declared that we we claim is:

1. In a transmission system for sensitive indicators, the combination with the sensitive and follow-up elements thereof, a two-part A. C. electrical pick-off, one part being on each of said elements and the signal from which is substantially proportional to the relative displacement of said elements, a power motor controlled by said pick-off for driving said follow-up element, an A. C. transmitter driven by said motor for actuating remotely located repeater devices, and means for compensating the signals transmitted to said repeater devices from said transmitter by a correction factor derived from and a function of the signal from said pick-off, whereby lag between the sensitive element and repeater is eliminated.

2. In a transmission system for gyro compasses, the combination with sensitive and follow-up elements, a two-part electrical pick-off, one part being on each of said elements and the signal from which is approximately proportional to their relative displacement, a follow-up motor for driving said follow-up element controlled from said pick-off, a selsyn transmitter driven thereby, a selsyn signal generator controlled thereby, a second power motor having a follow-back connection to said signal generator, a correction device for correcting the north-steaming error of the compass, means for shifting the field of said selsyn generator from said device, a second selsyn transmitter for actuating repeaters driven by said power motor, and means for controlling said second power motor from the combined signals of said pick-off and selsyn signal generator, whereby all lag in the follow-up and relay transmission systems is eliminated in the repeaters and the repeaters are also corrected for the north-steaming error of the compass.

3. A transmission system for sensitive indicators as claimed in claim 1, in which said compensating means includes a relay transmission device located between said A. C. transmitter and said repeater devices, said relay including a signal generator electrically connected to said transmitter, a power motor operated from the combined output of said signal generator and said electrical pick-off, and a second transmitter mounted on the same shaft as said signal generator, said power motor driving said shaft and said last named transmitter operating said repeater devices.

4. A transmission system as claimed in claim 1, wherein said transmitter is provided with a constantly excited field winding and an auxiliary winding producing a field having its axis inclined to the axis of the field of said first named winding to modify the signals transmitted thereby, and means for exciting said auxiliary winding from said pick-off, whereby any lag in the follow-up system is corrected in the repeater.

5. A transmission system as claimed in claim 1, having an auxiliary transmitter of the selsyn generator type also driven by said follow-up element, said auxiliary transmitter being provided with an excitation winding energized from said pick-up and the output of said auxiliary transmitter modifying the output of said first mentioned transmitter to correct for lag.

6. In a transmission system for sensitive indicators, the combination with sensitive and follow-up elements, a two-part electrical pick-off, one part being on each of said elements and the signal from which is approximately proportional to their relative displacement, a follow-up motor for driving said follow-up element controlled from said pick-off, a selsyn transmitter driven thereby, a selsyn signal generator controlled thereby, a second power motor having a followback connection to said signal generator, a second selsyn transmitter for actuating repeaters driven by said power motor, and means for controlling said second power motor from the combined signals of said pick-off and selsyn signal generator, whereby all lag in the follow-up and relay transmission systems is eliminated in the repeaters.

7. In an electrical positional control system employing selsyn type directional transmitting and receiving devices as component parts of the system, the combination with a primary element the direction of which is to be transmitted, a secondary element, an inductive pick-off between said elements, the signal from which is proportional to their relative displacement, a power motor actuated thereby for turning said secondary element, and a selsyn transmitter actuated thereby for operating the receiver, said transmitter having an auxiliary winding excited from the output of said inductive pick-off for advancing the angular position transmitted by said transmitter through an angle proportional to the signal from said inductive pick-off.

8. In an electrical positional control system employing selsyn type directional transmitting and receiving devices as component parts of the system, the combination with a primary element the direction of which is to be transmitted, a secondary element, a selsyn transmitter actuated thereby, an inductive pick-off between said elements, the signal from which is proportional to their relative displacement, a second selsyn transmitter for driving said receiver, electro-motive means for operating said second transmitter and said secondary element, a selsyn signal generator also turned from said means and electrically connected with said first named transmitter, and an electrical network between said signal generator and means for driving the latter, including a connection from said inductive pick-off whereby lag in the transmission system is eliminated.

WILLIAM GEORGE HARDING.
ROBERT HAYES NISBET.